US012708976B2

(12) United States Patent
Morin et al.

(10) Patent No.: US 12,708,976 B2
(45) Date of Patent: Aug. 18, 2026

(54) ROBOTIC POLISHING SYSTEM AND METHOD FOR USING SAME

(71) Applicant: Pratt & Whitney Canada Corp., Longueuil (CA)

(72) Inventors: Philippe Morin, Beloeil (CA); Canam Hoang, Longueuil (CA); Jean-Francois Collette, Montreal (CA); Pierre-Luc Nault, Sainte-Julie (CA); Guillaume Whittom, Longueuil (CA); Guillaume Fortier, Saint-Sauveur (CA)

(73) Assignee: Pratt & Whitney Canada Corp., Longueuil (CA)

( * ) Notice: Subject to any disclaimer, the term of this patent is extended or adjusted under 35 U.S.C. 154(b) by 418 days.

(21) Appl. No.: 18/397,965

(22) Filed: Dec. 27, 2023

(65) Prior Publication Data

US 2024/0208073 A1 Jun. 27, 2024

Related U.S. Application Data

(60) Provisional application No. 63/435,489, filed on Dec. 27, 2022.

(51) Int. Cl.
*B24B 21/16* (2006.01)
*B25J 9/16* (2006.01)
(Continued)

(52) U.S. Cl.
CPC ........... *B24B 21/165* (2013.01); *B25J 9/1664* (2013.01); *B25J 9/1692* (2013.01); *B25J 9/1697* (2013.01);
(Continued)

(58) Field of Classification Search
CPC ... B24B 21/165; B24B 27/0038; B24B 41/04; B24B 47/22; B24B 51/00; B24B 53/003;
(Continued)

(56) References Cited

U.S. PATENT DOCUMENTS 8,900,037 B2 12/2014 Jöst
2009/0149119 A1* 6/2009 Ahti ........................ B25J 9/1679 451/296

(Continued)

FOREIGN PATENT DOCUMENTS

CN 105269555 A * 1/2016 ............. G01B 11/27
CN 115008314 A 9/2022

(Continued)

OTHER PUBLICATIONS

EP Search Report for EP Patent Application No. 23220640.9 dated Aug. 20, 2024.

*Primary Examiner* — Brian Christopher Delrue
(74) *Attorney, Agent, or Firm* — Getz Balich LLC

(57) ABSTRACT

A polishing system includes a robotic polishing assembly, a calibration system, a belt cleaning assembly, and a controller. The robotic polishing assembly includes a robotic arm and an end effector. The end effector includes a polishing arm, a motor, and a tool head. The calibration system includes an imaging device. The belt cleaning assembly includes a first lateral brush and a second lateral brush. The controller is in signal communication with the robotic polishing assembly and the calibration system. The controller includes a processor in communication with a non-transitory memory storing instructions, which instructions when executed by the processor, cause the processor to identify a cleaning requirement for the tool head and control the robotic polishing assembly to clean the tool head by moving the tool head to engage the belt cleaning assembly.

20 Claims, 7 Drawing Sheets

(51) Int. Cl.
*B25J 11/00* (2006.01)
*B25J 15/00* (2006.01)
*B25J 19/00* (2006.01)

(52) U.S. Cl.
CPC ....... *B25J 11/0065* (2013.01); *B25J 15/0019* (2013.01); *B25J 19/0058* (2013.01)

(58) Field of Classification Search
CPC ...... B24B 53/007; B24B 19/14; B25J 9/1664; B25J 9/1697; B25J 15/0019; B25J 19/0058; B25J 9/1679; B25J 9/1692; B08B 1/12; B08B 5/02; G05B 2219/45058; G05B 2219/45096
See application file for complete search history.

(56) References Cited

U.S. PATENT DOCUMENTS

| | | | | |
|---|---|---|---|---|
| 2012/0322349 | A1* | 12/2012 | Josi | B24B 55/06 451/73 |
| 2022/0143837 | A1* | 5/2022 | Naderer | B25J 15/04 |

FOREIGN PATENT DOCUMENTS

| | | | |
|---|---|---|---|
| CN | 115319769 | A | 11/2022 |
| CN | 115365956 | A | 11/2022 |

* cited by examiner

ROBOTIC POLISHING SYSTEM AND METHOD FOR USING SAME

This application claims priority to U.S. Patent Appln. No. 63/435,489 filed Dec. 27, 2022, which is hereby incorporated herein by reference in its entirety.

TECHNICAL FIELD

This disclosure relates generally to robotic machining systems, more particularly, to systems and methods for cleaning robotic machining systems.

BACKGROUND OF THE ART

Robotic machining systems may be used to accomplish one or more machining (e.g., polishing) operations for the manufacture of components. Various robotic machining systems are known in the art. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a polishing system includes a robotic polishing assembly, a calibration system, a belt cleaning assembly, and a controller. The robotic polishing assembly includes a robotic arm and an end effector. The robotic arm includes a plurality of movable joints extending between and to a base end and a distal end. The end effector is disposed at the distal end. The end effector includes a polishing arm, a motor, and a tool head. The motor is mounted on the polishing arm. The tool head extends along a lengthwise axis between and to an inner end and a tip end. The inner end is disposed on the polishing arm at the motor. The tool head is configured to retain an abrasive belt connected to the motor. The calibration system includes an imaging device. The belt cleaning assembly includes a first lateral brush and a second lateral brush. The controller is in signal communication with the robotic polishing assembly and the calibration system. The controller includes a processor in communication with a non-transitory memory storing instructions, which instructions when executed by the processor, cause the processor to identify a cleaning requirement for the tool head using the image data and control the robotic polishing assembly to clean the tool head by moving the tool head to engage one or both of the first lateral brush and the second lateral brush.

In any of the aspects or embodiments described above and herein, the instructions, when executed by the processor, may further cause the processor to identify the cleaning requirement based on an operational use of the tool head for a polishing operation.

In any of the aspects or embodiments described above and herein, the instructions, when executed by the processor, may further cause the processor to identify the cleaning requirement based on an identification of a calibration requirement for the tool head.

In any of the aspects or embodiments described above and herein, the polishing system may further include a calibration system including an imaging device.

In any of the aspects or embodiments described above and herein, the instructions, when executed by the processor, may further cause the processor to acquire image data for the tool head in response to identification of the calibration requirement.

In any of the aspects or embodiments described above and herein, the tool extension may include a first lateral side, a second lateral side, and a flat portion, the flat portion disposed on the second lateral side, the tool head including one or more artifacts disposed on the flat portion.

In any of the aspects or embodiments described above and herein, the instructions, when executed by the processor, may further cause the processor to determine a calibration position of the tool center point subsequent to controlling the robotic polishing assembly to clean the tool head.

In any of the aspects or embodiments described above and herein, the instructions, when executed by the processor, may further cause the processor to determine the calibration position of the tool center point using the image data, the image data including the one or more artifacts.

In any of the aspects or embodiments described above and herein, the tool head may further include a belt tensioner and a roller. The belt tensioner may be configured to bias the tip end outward from the inner end along the lengthwise axis. The roller may be rotatable about a tool center point of the tool head at the tip end. The tool head may be configured to retain an abrasive belt extending between the motor and the roller. The belt tensioner may include a tool guide, a tool extension, and a biasing member. The tool guide may be disposed at the inner end. The tool extension may be disposed at the tip end. The biasing member may be configured to bias the tool extension outward from the tool guide along the lengthwise axis.

In any of the aspects or embodiments described above and herein, the belt cleaning assembly may further include a first lateral air nozzle and a second lateral air nozzle. The first lateral air nozzle may be configured to direct a first stream of pressurized air and the second lateral air nozzle may be configured to direct a second stream of pressurized air.

In any of the aspects or embodiments described above and herein, the instructions, when executed by the processor, may further cause the processor to control the first lateral air nozzle to direct the first stream of pressurized air at the first lateral side and then control the second lateral air nozzle to direct the second stream of pressurized air at the second lateral side.

According to another aspect of the present disclosure, a method for cleaning a tool head of an end effector for a robotic polishing system is provided. The method includes identifying a calibration requirement for the tool head. The tool head extends between and to an inner end and a tip end. The tool head includes an abrasive belt, a belt tensioner, a roller, and one or more first artifacts. The abrasive belt is disposed on the belt tensioner and the roller. The belt tensioner includes a tool guide, a tool extension, and a biasing member. The tool guide is disposed at the inner end. The tool extension may be disposed at the tip end. The biasing member biases the tool extension outward from the tool guide. The roller is rotatable about a tool center point of the tool head at the tip end. The method further includes identifying a cleaning requirement for the tool head, cleaning the tool head by moving the tool head to engage at least one brush of a tool cleaning assembly, and acquiring image data of the tool head subsequent to cleaning the tool head.

In any of the aspects or embodiments described above and herein, the method further includes determining a calibration position of the tool center point using the image data.

In any of the aspects or embodiments described above and herein, cleaning the tool head may further include directing a stream of pressurized air at the tool head.

In any of the aspects or embodiments described above and herein, the tool extension may include a first lateral side, a second lateral side, and a flat portion. The flat portion may be disposed on the second lateral side. One or more artifacts may be disposed on the flat portion. The step of acquiring the image data may include acquiring image data of the one or more artifacts.

In any of the aspects or embodiments described above and herein, cleaning the tool head may further include directing a first stream of pressurized air at the first lateral side and then directing a second stream of pressurized air at the second lateral side.

According to another aspect of the present disclosure, a polishing system includes a robotic polishing assembly including an end effector. The end effector includes a tool head. The tool head extends between and to an inner end and a tip end. The tool head includes an abrasive belt, a belt tensioner, and a roller. The abrasive belt is disposed on the belt tensioner and the roller. The belt tensioner includes a tool guide, a tool extension, and a biasing member. The tool guide is disposed at the inner end. The tool extension is disposed at the tip end. The biasing member is configured to bias the tool extension outward from the tool guide. The tool extension includes a first lateral side and a second lateral side. The roller is rotatable about a tool center point of the tool head at the tip end. The calibration system including an imaging device. The belt cleaning assembly includes a first lateral arm portion and a second lateral arm portion. The first lateral arm portion is laterally spaced from the second lateral arm portion. The first lateral arm portion includes a first lateral brush and a first lateral air nozzle. The second lateral arm portion includes a second lateral brush and a second lateral air nozzle. The controller is in signal communication with the robotic polishing assembly and the calibration system. The controller includes a processor in communication with a non-transitory memory storing instructions, which instructions when executed by the processor, cause the processor to: control the imaging device to acquire image data for the tool head, identify a cleaning requirement for the tool head using the image data, control the robotic polishing assembly to clean the tool head by moving the tool head to engage one or both of the first lateral brush and the second lateral brush, and control the first lateral air nozzle to direct the first stream of pressurized air at the first lateral side and then control the second lateral air nozzle to direct the second stream of pressurized air at the second lateral side.

In any of the aspects or embodiments described above and herein, the instructions, when executed by the processor, may further cause the processor to identify the cleaning requirement based on an operational use of the tool head for a polishing operation.

In any of the aspects or embodiments described above and herein, the instructions, when executed by the processor, may further cause the processor to identify a calibration requirement for the tool head and, in response to identification of the calibration requirement, control an imaging device to acquire image data for the tool head subsequent to cleaning the tool head.

In any of the aspects or embodiments described above and herein, the instructions, when executed by the processor, may further cause the processor to identify the calibration requirement based on a measure of abrasive belt usage exceeding a usage threshold.

The present disclosure, and all its aspects, embodiments and advantages associated therewith will become more readily apparent in view of the detailed description provided below, including the accompanying drawings.

DETAILED DESCRIPTION

Figure 1:
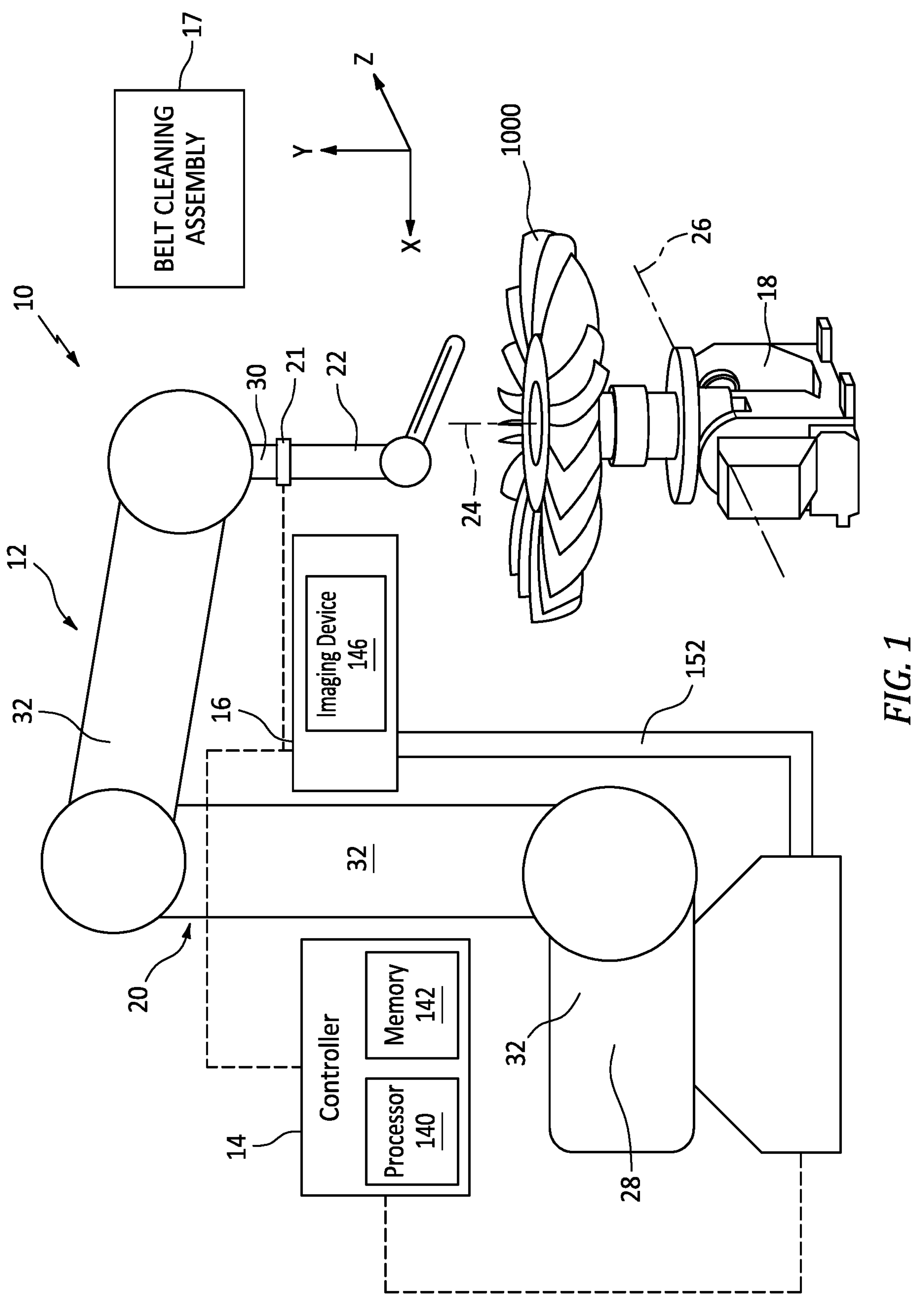
FIG. 1 diagrammatically illustrates a polishing system, in accordance with one or more embodiments of the present disclosure.

FIG. 1 illustrates a polishing system 10 for use in the manufacture of a workpiece 1000. The present disclosure polishing system 10 may provide particular utility when implemented for polishing workpiece 1000 surfaces having complex curvatures, restrictive machining tolerances, and/or hard metals or metal alloys such as, but not limited to, titanium. As an example, the workpiece 1000 of FIG. 1 is a bladed disk ("blisk") for a gas turbine engine fan for an aircraft propulsion system. The present disclosure, however, is not limited to any particular workpiece 1000 type, configuration, or material. Moreover, while the polishing system 10 is discussed herein with respect to the performance of polishing processes, aspects of the present disclosure may also be applicable to grinding or other machining processes. The polishing system 10 of FIG. 1 includes a robotic polishing assembly 12, a controller 14, a calibration system 16, and a tool cleaning assembly 17. The polishing system 10 may be located within or otherwise include an enclosure (not shown) to contain dust and/or other particulate (e.g., titanium dust) which may be produced during a polishing process, and which may present fire and/or explosion risk.

The robotic polishing assembly 12 of FIG. 1 provides automated control of one or more machining tools (e.g., polishing tools) based on coded programming instructions executed by a controller (e.g., the controller 14). The robotic polishing assembly 12 of FIG. 1 includes a workpiece positioning fixture 18, a robotic arm 20, an active contact flange 21, and an end effector 22. To be clear, this robotic polishing assembly 12 configuration of FIG. 1 is exemplary, and the present disclosure polishing system 10 is not limited to use with the particular robotic polishing assembly 12 configuration of FIG. 1.

The workpiece positioning fixture 18 is configured to securely retain and position the workpiece 1000 for a polishing process and/or another machining process. For example, the workpiece positioning fixture 18 may be configured to rotate the workpiece 1000 a first axis 24. The workpiece positioning fixture 18 may additionally or alternatively be configured to rotate (e.g., tilt the workpiece 1000) about a second axis 26. The second axis 26 may be perpendicular to the first axis 24.

The robotic arm 20 includes a base end 28, a distal end 30, and one or more moveable joints 32. Each movable joint 32 may be moved or otherwise controlled, for example, by an independent servo motor or other actuator (not shown). The distal end 30 is connected to the end effector 22. The robotic arm 20 is configured move the end effector 22 relative to the workpiece 1000 and/or to another component or assembly (e.g., a cleaning assembly) of the polishing system 10. For example, the robotic arm 20 may be configured to move the end effector 22 along an x-axis, a y-axis, and a z-axis, as well as to rotate the end effector 22 relative to the x-axis, the y-axis, and the z-axis (e.g., pitch, yaw, and roll).

The force control device 21 connects the robotic arm 20 to the end effector 22. The force control device 21 may be mounted on the distal end 30 of the robotic arm 30. The force control device 21 may be disposed at (e.g., on, adjacent, or proximate) the end effector 22 and may be directly or indirectly mounted to the end effector 22. The force control device 21 may be configured, for example, as an active contact flange including a pneumatic linear actuator (e.g., a bellow-type pneumatic linear actuator) or other linear actuator configured to translate along an axis (e.g., a single, linear axis) to control a position of the end effector 22 relative to the robotic arm 20. The force control device 21 may additionally include a compressor and/or a pressure control assembly (e.g., a pressure control valve) configured to control an air pressure within the pneumatic linear actuator and, thereby, control a linear position of the pneumatic linear actuator including a fully extended position, a fully retracted position, or a plurality of intermediate linear positions between the fully extended position and the fully retracted position. The force control device 21 may additionally include a pressure sensor configured to measure an air pressure within the pneumatic linear actuator. The force control device 21 may be connected in signal communication with the controller 14, for example, to facilitate positional control of the force control device 21 by the controller 14 and to transmit pressure measurements from the pressure sensor to the controller 14. The pressure measurements from the pressure sensor may facilitate calculation, by the controller 14, of force applied (e.g., to a workpiece) by the end effector 22. Exemplary configurations of the force control device 21 may include, but are not limited to, those sold under the ACF® trademark by FerRobotics Compliant Robot Technology GmbH (Austria).

Figure 2:
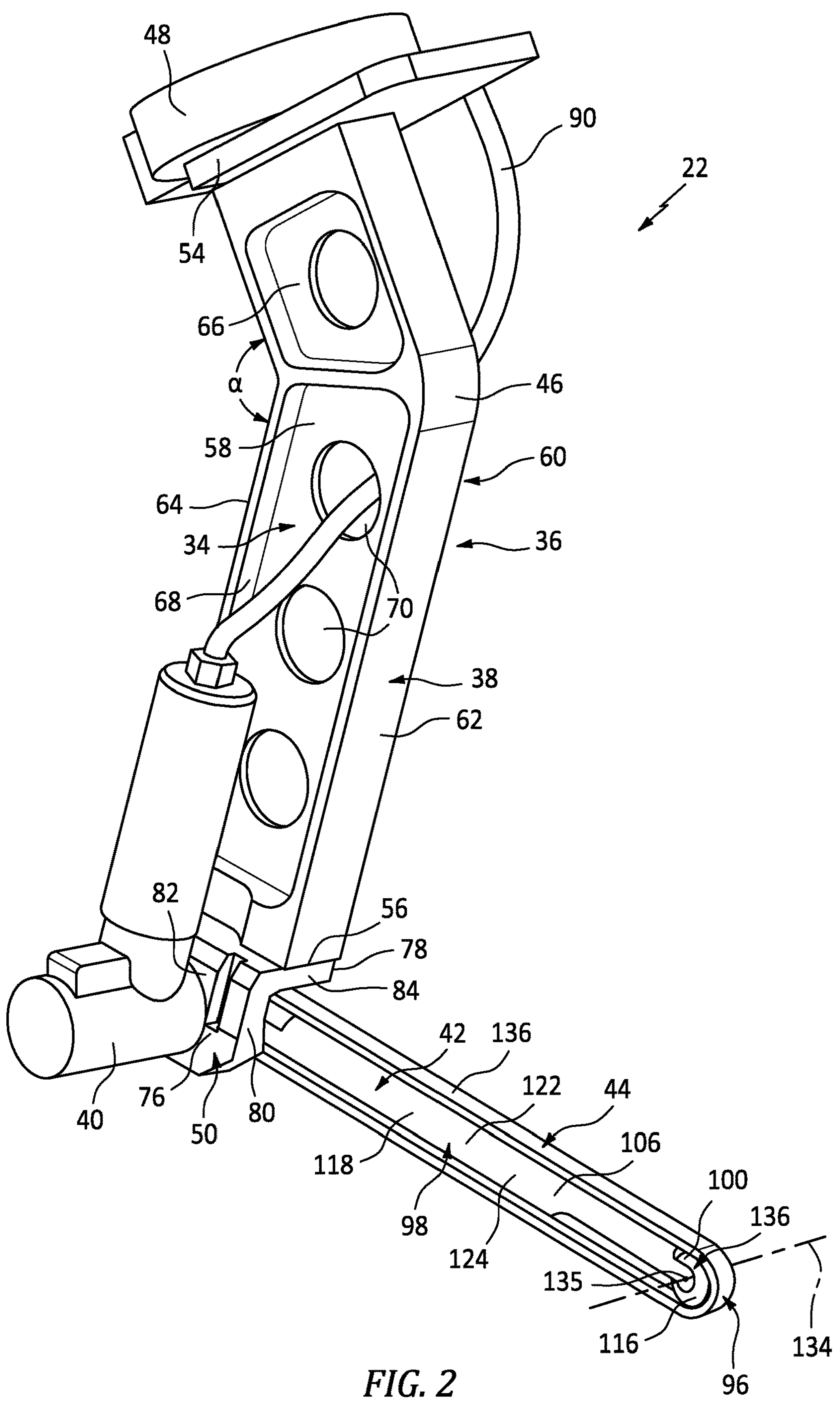
FIG. 2 illustrates a perspective view of an end effector for a polishing system, in accordance with one or more embodiments of the present disclosure.
Figure 3:
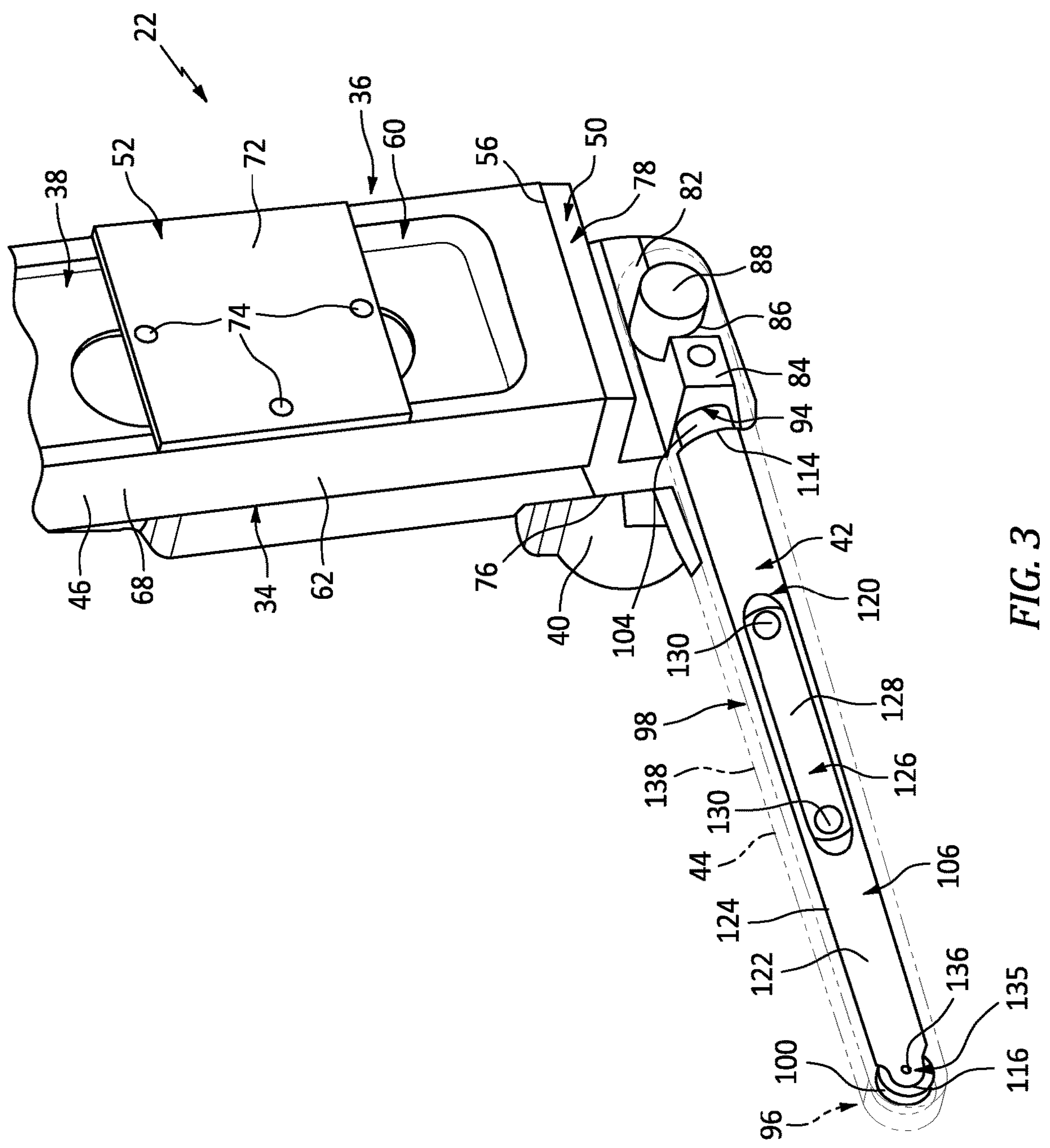
FIG. 3 illustrates another perspective view of an end effector for a polishing system, in accordance with one or more embodiments of the present disclosure.

FIGS. 2 and 3 illustrate perspective views of the end effector 22. The end effector 22 of FIGS. 2 and 3 has a first lateral side 34 and a second lateral side 36. The end effector 22 of FIGS. 2 and 3 includes a polishing arm 38, a motor 40, a tool head 42, and an abrasive belt 44. The polishing system 10 (see FIG. 1) may be configured to selectively attach and detach different end effectors 22 to facilitate polishing system 10 performance of different polishing operations or to replace degraded or faulty end effectors 22.

The polishing arm 38 of FIG. 2 includes an arm body 46, an attachment flange 48, and a motor housing 50. The polishing arm 38 may additionally include a calibration panel 52. The arm body 46 extends (e.g., lengthwise) between and to a proximate end 54 of the arm body 46 and a distal end 56 of the arm body 46. The arm body 46 of FIG. 2 has a first lateral side 58, a second lateral side 60, a front side 62, and a rear side 64. Each of the first lateral side 58, the second lateral side 60, the front side 62, and the rear side 64 extend between and to the proximate end 54 and the distal end 56. The first lateral side 58 and the second lateral side 60 may respectively correspond with the first lateral side 34 and the second lateral side 36. The arm body 46 may include a first body portion 66 and a second body portion 68. The first body portion 66 may extend from the proximate end 54 to the second body portion 68. The second body portion 68 may extend from the first body portion 66 to the distal end 56. The first body portion 66 and the second body portion 68 may extend transversely relative to one another. For example, the first body portion 66 and the second body portion 68 may form an angle $\alpha$ of the arm body 46, which angle $\alpha$ may be understood to be disposed on an imaginary plane extending through the front side 62 and the rear side 64. The arm body 46 of FIG. 2 is illustrated with an angle $\alpha$ of approximately forty-five degrees (45°), however, the present disclosure is not limited to any particular angle $\alpha$ of the arm body 46. The angle $\alpha$ of the arm body 46 may facilitate positioning of the tool head 42 relative to the workpiece 1000 by the robotic arm 20 (see FIG. 1). The arm body 46 may form one or more apertures 70 extending through the arm body 46, for example, from the first lateral side 58 to the second lateral side 60. The apertures 70 may facilitate a reduction in weight of the arm body 46 while also facilitating access and directing pneumatic conduits, sensors cables, and the like for the end effector 22.

The attachment flange 48 is mounted to or otherwise disposed at (e.g., on, adjacent, or proximate) the proximate end 54. The attachment flange 48 is selectively attachable to the robotic arm 20, for example, at (e.g., on, adjacent, or proximate) the force control device 21.

The motor housing 50 is mounted to or otherwise disposed at (e.g., on, adjacent, or proximate) the distal end 56. The motor housing 50 has a first lateral side 76 and a second lateral side 78. The first lateral side 76 and the second lateral side 78 may respectively correspond with the first lateral side 34 and the second lateral side 36. The motor housing 50 includes a housing body 80. The housing body 80 of FIGS. 2 and 3 includes a first mount portion 82 and a second mount portion 84. The first mount portion 82 extends along the first lateral side 76. The first mount portion 82 forms a shaft aperture 86 through the first mount portion 82 in a direction from the first lateral side 76 toward the second lateral side 78. The first mount portion 82 is configured to receive and support the motor 40 at (e.g., on, adjacent, or proximate) the first lateral side 76. The second mount portion 84 extends (e.g., laterally extends) from the first mount portion 82 toward the second lateral side 78. The second lateral side 78 is open to allow the abrasive belt 44 to be installed on and removed from the motor 40.

The calibration panel 52 of FIG. 3 is disposed on the arm body 46 (e.g., the second body portion 68) at (e.g., on, adjacent, or proximate) the second lateral side 60. The calibration panel 52 includes a calibration surface 72 and one or more artifacts 74. The calibration surface 72 may be flat (e.g., planar or substantially planar). The calibration surface 72 faces away from the arm body 46. The artifacts 74 are disposed on the calibration surface 72. The artifacts 74 may include a localized marking, discoloration, projection, indentation, or the like which is identifiable by a machine vision system (e.g., the calibration system 16) as a calibration reference point. The calibration panel 52 of FIG.

3 includes three artifacts 74 on the calibration surface 72, however, the present disclosure is not limited to any particular number of artifacts 74 for the calibration surface 72.

The motor 40 is mounted to or otherwise disposed at (e.g., on, adjacent, or proximate) the motor housing 50. For example, the motor 40 of FIGS. 2 and 3 is mounted on the first mount portion 82 on the first lateral side 76. The motor 40 includes a rotatable shaft 88. The rotatable shaft 88 extends (e.g., laterally extends) through the shaft aperture 86 to an interior of the motor housing 50. The motor 40 is configured to rotate the rotatable shaft 88 to drive the abrasive belt 44 for a polishing process. The motor 40 of FIGS. 2 and 3 is configured as a pneumatic motor, which pneumatic motor is configured to be driven by a pressurized gas (e.g., air) directed to the motor 40 by a pneumatic conduit 90. The use of a pneumatic motor for the motor 40 may eliminate or reduce the occurrence of sparks during motor 40 operation, thereby facilitating improvements in safety for applications of the present disclosure polishing system 10 (see FIG. 1) which may generate quantities of volatile particulate such as titanium or other metal dust. The present disclosure, however, is not limited to the use of a pneumatic motor for the motor 40, and the motor 40 may alternatively be configured, for example, as an electric motor.

Figure 4:
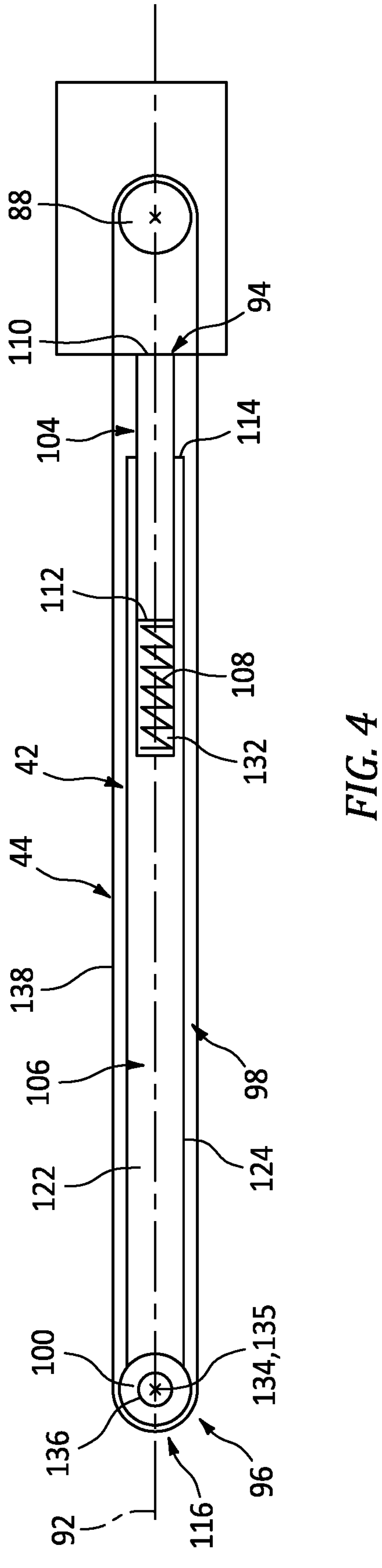
FIG. 4 illustrates a cutaway, side view of a portion of a tool head for a polishing system end effector, in accordance with one or more embodiments of the present disclosure.

Referring to FIGS. 2-4, the tool head 42 extends along a lengthwise axis 92 between and to an inner end 94 of the tool head 42 and a tip end 96 of the tool head 42. The inner end 94 is disposed at (e.g., on, adjacent, or proximate) the polishing arm 38 (e.g., the motor housing 50). The lengthwise axis 92 may extend orthogonally or substantially orthogonally relative to the arm body 46 (e.g., a lengthwise dimension of the second body portion 68). The present disclosure, however, is not limited to this particular orientation of the lengthwise axis 92 relative to the polishing arm 38. For example, the lengthwise axis 92 may be oriented at any suitable angle relative to the arm body 46 including a colinear orientation of the lengthwise axis 92 relative to the arm body 46. The tool head 42 of FIGS. 2-4 includes a belt tensioner 98 and a roller 100.

The belt tensioner 98 includes a tool guide 104, a tool extension 106, and a biasing member 108. The tool guide 104 is disposed at (e.g., on, adjacent, or proximate) the inner end 94. The tool guide 104 extends (e.g., lengthwise) between and to a first end 110 of the tool guide 104 and a second end 112 of the tool guide 104. The first end 110 is mounted to or otherwise disposed at (e.g., on, adjacent, or proximate) the motor housing 50. For example, the first end 110 of FIGS. 2-4 is mounted (e.g., fixedly mounted) to the second mount portion 84. The tool guide 104 may be configured as a cylindrical body, however, the present disclosure is not limited to any particular shape of the tool guide 104.

The tool extension 106 is disposed at (e.g., on, adjacent, or proximate) the tip end 96. The tool extension 106 extends (e.g., lengthwise) between and to a first end 114 of the tool extension 106 and a second end 116 of the tool extension 106. The tool extension 106 has a first lateral side 118 and a second lateral side 120. The first lateral side 118 and the second lateral side 120 may respectively correspond with the first lateral side 34 and the second lateral side 36. The tool extension 106 includes an extension body 122 extending from the first end 114 to the second end 116. The extension body 122 includes an exterior surface 124 and a flat portion 126. The exterior surface 124 extends between the first end 114 and the second end 116. The exterior surface 124 extends circumferentially about (e.g., completely around) the lengthwise axis 92, except at the location of the flat portion 126. For example, the extension body 122 may generally be configured as a cylindrical body, except at the location of the flat portion 126. As shown in FIGS. 2 and 3, the flat portion 126 may be disposed on the second lateral side 120. For example, the flat portion 126 may be disposed only on the second lateral side 120 (e.g., not on the first lateral side 118). The flat portion 126 extends (e.g., lengthwise) along the second lateral side 120 a portion of a distance between the first end 114 and the second end 116. For example, the flat portion 126 may be spaced from the first end 114 and/or the second end 116. The flat portion 126 includes a calibration surface 128 and one or more artifacts 130. The calibration surface 128 may be flat (e.g., planar or substantially planar). The artifacts 130 may include a localized marking, discoloration, projection, indentation, or the like which is identifiable by a machine vision system (e.g., the calibration system 16) as a calibration reference point. The flat portion 126 of FIG. 3 includes two artifacts 130 on the calibration surface 128, however, the present disclosure is not limited to any particular number of artifacts 130 for the calibration surface 128. As shown in FIG. 3, a first of the artifacts 130 may be disposed at (e.g., on, adjacent, or proximate) a first lengthwise end of the calibration surface 128 while a second of the artifacts 130 may be disposed at (e.g., on, adjacent, or proximate) a second lengthwise end of the calibration surface 128, opposite the first lengthwise end. The present disclosure, however, is not limited to the particular artifact 130 orientations of FIG. 3.

The extension body 122 forms an internal bore 132 as shown, for example, in FIG. 4. The internal bore 132 extends from the first end 114 toward the second end 116. The internal bore 132 is configured to receive the tool guide 104 (e.g., the second end 112) and to facilitate axial translation (e.g., along the lengthwise axis 92) of the tool extension 106 relative to the tool guide 104.

The biasing member 108 of FIG. 4 is disposed within the internal bore 132. The biasing member 108 is disposed between (e.g., axially between) the tool guide 104 (e.g., the second end 112) and the extension body 122, with respect to the lengthwise axis 92. The biasing member 108 is configured to bias the tool extension 106 away from (e.g., axially away from) the tool guide 104 to apply a tension to the abrasive belt 44 installed on the tool head 42. The biasing member 108 of FIG. 4 is configured as a spring, however, the present disclosure is not limited to the use of a spring for the biasing member 108.

The roller 100 is disposed at (e.g., on, adjacent, or proximate) the tip end 96. The roller 100 is configured to rotate about a rotational axis 134 disposed at a tool center point 135) of the tool head 42. The rotational axis 134 may extend (e.g., laterally extend) through the first lateral side 118 and the second lateral side 120. The roller 100 may be configured with a cylindrical shape, or torus shape, or another suitable shape for controlling movement of the abrasive belt 44. The rotational axis 134 (e.g., the tool center point 135) may be formed by a roller body 136 such as, but not limited to, a shaft, a pin, a dowel, or the like, about which the roller 100 may rotate. The roller body 136 may function, for example, as an artifact (e.g., the artifacts 74, 130) which is identifiable by a machine vision system (e.g., the calibration system 16) as a calibration reference point, thereby facilitating the determination of a position and an orientation of the tool center point 135 using the calibration system 16.

The abrasive belt 44 is installed on the tool head 42 in rotational communication with the rotatable shaft 88 and the roller 100. The abrasive belt 44 includes an abrasive outer surface 138 which is configured for polishing, grinding, or otherwise machining one or more surfaces of a workpiece (e.g., the workpiece 1000). The abrasive outer surface 138 may be configured with a degree of abrasiveness (e.g., coarseness, grit, etc.) which may be selected for a particular polishing operation or workpiece surface). The belt tensioner 98 applies a suitable tension to the abrasive belt 44 to secure the abrasive belt 44 on the rotatable shaft 88 and the roller 100 and to allow the abrasive belt 44 to be driven (e.g., moved) along a path between the rotatable shaft 88 and the roller 100 by rotation of the rotatable shaft 88.

The controller 14 of FIG. 1 is connected in signal communication with the robotic polishing assembly 12 and the calibration system 16. The controller 14 includes a processor 140 and memory 142. The memory 142 is connected in signal communication with the processor 140. The processor 140 may include any type of computing device, computational circuit, or any type of process or processing circuit capable of executing a series of instructions that are stored in the memory 142, thereby causing the processor 140 to perform or control one or more steps or other processes. The processor 140 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 142 may represent one or more algorithms for controlling aspects of the robotic polishing assembly 12 and/or the calibration system 16, and the stored instructions are not limited to any particular form (e.g., program files, system data, buffers, drivers, utilities, system programs, etc.) provided they can be executed by the processor 140. The instructions stored in memory 142 may be in the form of G-code, M-code, or another suitable programming language which can be executed by the controller 14 and/or its processor 140. The instructions stored in memory 142 may be generated by computer-aided design (CAD) or computer-aided manufacturing (CAM) software, whereby the physical dimensions of a particular workpiece (e.g., the workpiece 1000) may be translated into instructions (e.g., computer numerical control (CNC) instructions) for execution by the robotic polishing assembly 12. The memory 142 may be a non-transitory computer readable storage medium configured to store instructions that when executed by one or more processors, cause the one or more processors to perform or cause the performance of certain functions. The memory 142 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 14 may be achieved via the use of hardware, software, firmware, or any combination thereof. The controller 14 may also include input and output devices (e.g., keyboards, buttons, switches, touch screens, video monitors, sensor readouts, data ports, etc.) that enable the operator to input instructions, receive data, etc.

The calibration system 16 of FIG. 1 includes an imaging device 146 and a support fixture 152. The imaging device 146 may be configured as a two-dimensional (2D) camera, a three-dimensional (3D) camera, or other suitable imaging device configured to capture 2D images (e.g., 2D image data) and/or 3D images (e.g., 3D image data) of the end effector 22. The support fixture 152 is configured to support the imaging device 146 in a position relative to the end effector 22, for example, with a line-of-sight to the artifacts 74, the artifacts 130, and the roller body 136. The support fixture 152 may be mounted to or formed by the robotic polishing assembly 12. The support fixture 152 may be fixed (e.g., relative to the robotic polishing assembly 12 (e.g., a fixed portion of the robotic polishing assembly 12 such as the base end 28) or to a machine coordinate system for the robotic polishing assembly 12. Alternatively, the support fixture 152 may be movable to position the imaging device 146 relative to the end effector 22. For example, the support fixture 152 may be movable to position the imaging device 146 in one of a deployed position or a stowed position. The deployed position may be a position in which the imaging device 146 has a line-of-sight to the artifacts 74, the artifacts 130, and the roller body 136. The stowed position may be a position in which the imaging device 146 is positioned (e.g., in an enclosure (not shown)) to protect the imaging device 146 from dust, debris, or other particulate generated during a polishing operation. Operation of the calibration system 16 may be controlled by the controller 14. Alternatively, the calibration system 16 may include and be controlled by a separate controller independent of the controller 14. The calibration system 16 may include or otherwise be formed by a robotic machine vision system such as, for example, those manufactured and sold by FANUC Corporation (e.g., under the trade name FANUC iRVision).

Figures 5, 6:
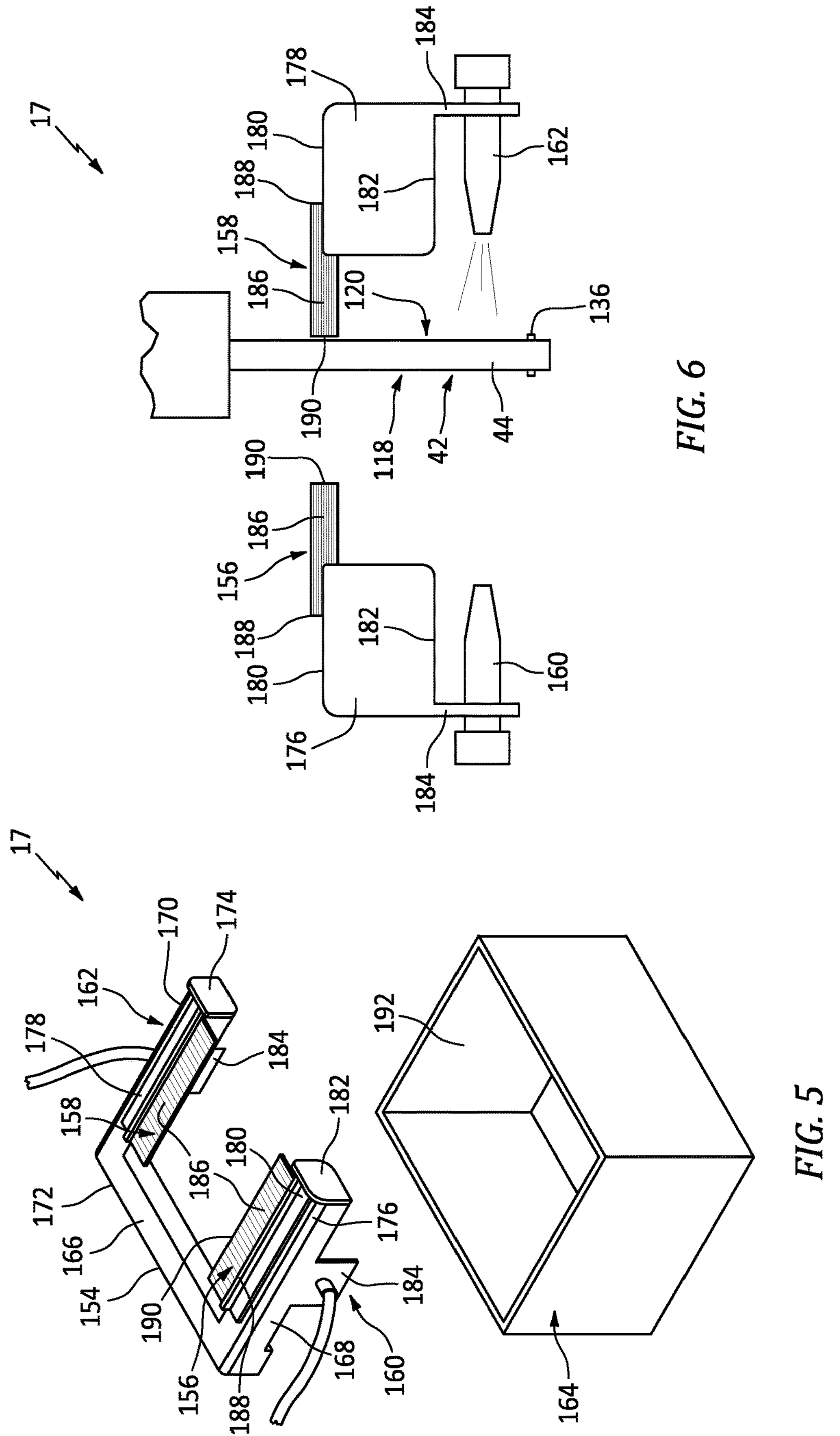
FIG. 5 illustrates a perspective view of a tool cleaning assembly for a polishing system, in accordance with one or more embodiments of the present disclosure.
FIG. 6 illustrates a front view of a portion of the tool cleaning assembly of FIG. 5, in accordance with one or more embodiments of the present disclosure.

FIGS. 5 and 6 illustrate the tool cleaning assembly 17. The tool cleaning assembly 17 of FIGS. 5 and 6 includes a frame 154, a first lateral brush 156, a second lateral brush 158, a first lateral air nozzle 160, a second lateral air nozzle 162, and a dust receptacle 164.

The frame 154 includes a frame body 166. The frame body 166 extends (e.g., laterally extends) between and to a first lateral side 168 of the frame body 166 and a second lateral side 170 of the frame body 166. The frame body 166 extends (e.g., longitudinally extends) between and to a first longitudinal side 172 of the frame body 166 and a second longitudinal side 174 of the frame body 166. The first longitudinal side 172 may be configured to be mounted to or otherwise disposed at (e.g., on, adjacent, or proximate) a wall or other fixed structure in proximity to (e.g., within reach of) the robotic polishing assembly 12 (see FIG. 1). The frame body 166 includes a first lateral arm portion 176 and a second lateral arm portion 178. The first lateral arm portion 176 extends along the first lateral side 168 from the from the first longitudinal side 172 to the second longitudinal side 174. The second lateral arm portion 178 extends along the second lateral side 170 from the from the first longitudinal side 172 to the second longitudinal side 174. The first lateral arm portion 176 is laterally spaced from the second lateral arm portion 178. Each of the first lateral arm portion 176 and the second lateral arm portion 178 extend between and to a top side 180 and a bottom side 182. Each of the first lateral arm portion 176 and the second lateral arm portion 178 include a nozzle support member 184. The nozzle support member 184 may be mounted to or otherwise disposed at (e.g., on, adjacent, or proximate) the bottom side 182.

The first lateral brush 156 is mounted to or otherwise disposed at (e.g., on, adjacent, or proximate) the first lateral arm portion 176. For example, the first lateral brush 156 may be mounted on the top side 180 of the first lateral arm portion 176. Similarly, the second lateral brush 158 is mounted to or otherwise disposed at (e.g., on, adjacent, or proximate) the second lateral arm portion 178. For example, the second lateral brush 158 may be mounted on the top side 180 of the second lateral arm portion 178. Each of the first lateral brush 156 and the second lateral brush 158 including a plurality of bristles 186. The plurality of bristles 186 extend between and to a base end 188 of the plurality of bristles 186 and a distal end 190 of the plurality of bristles 186. The base end 188 and the distal end 190 extend (e.g., longitudinally extend) between the first longitudinal side 172 and the second longitudinal side 174. The plurality of bristles 186 extend in a laterally inward direction from the base end 188 to the distal end 190. In other words, the plurality of bristles 186 of the first lateral brush 156 extend laterally toward the second lateral brush 158 and the plurality of bristles 186 of the second lateral brush 158 extend laterally toward the first lateral brush 156. The distal end 190 of the plurality of bristles 186 for the first lateral brush 156 are spaced (e.g., laterally spaced) from the distal end 190 of the plurality of bristles 186 for the second lateral brush 158. The plurality of bristles 186 may be configured as horsehair bristles to minimize the generation of static electricity which may present a combustion risk in proximity to the robotic polishing assembly 12 (e.g., due to substantial amounts of airborne titanium dust). The present disclosure, however, is not limited to any particular material for the plurality of bristles 186.

Each of the first lateral air nozzle 160 and the second lateral air nozzle 162 are configured to receive pressurized air from a pressurized air source (not shown). As an example, the pressurized air supplied to the first lateral air nozzle 160 and the second lateral air nozzle 162 may be in the range of thirty (30) to fifty (50) PSI. The present disclosure, however, is not limited to any particular pressure for the pressurized air. The first lateral air nozzle 160 and the second lateral air nozzle 162 may be connected in fluid communication with the pressurized air source by any suitable conduit. The first lateral air nozzle 160 is mounted to or otherwise disposed at (e.g., on, adjacent, or proximate) the nozzle support member 184 of the first lateral arm portion 176. The first lateral air nozzle 160 is configured to selectively direct a stream of the pressurized air in a laterally inward direction (e.g., toward the second lateral air nozzle 162). The second lateral air nozzle 162 is mounted to or otherwise disposed at (e.g., on, adjacent, or proximate) the nozzle support member 184 of the second lateral arm portion 178. The second lateral air nozzle 162 is configured to selectively direct a stream of the pressurized air in a laterally inward direction (e.g., toward the first lateral air nozzle 160). The controller 14 may control the pressurized air for the first lateral air nozzle 160 and/or the second lateral air nozzle 162. For example, the controller 14 may control one or more flow control valves, flow regulators, or other fluid control devices (not shown) to supply or secure pressurized air to each of the first lateral air nozzle 160 and the second lateral air nozzle 162.

The dust receptacle 164 is configured to collect the dust and other particulate which may be removed from the end effector 22 (e.g., the tool head 42 and the abrasive belt 44) by the tool cleaning assembly 17. As shown in FIG. 5, the dust receptacle 164 may be configured as an open container 192 disposed below the lateral brushes 156, 158 and lateral air nozzles 160, 162 to receive the dust and other particulate which may fall during removal from the end effector 22. The dust receptacle 164 of the present disclosure, however, is not limited to the container 192 configuration of FIG. 5, and the dust receptacle 164 may alternatively be configured as a vacuum cleaner, an air filter, or another suitable device for collecting and storing airborne dust and particulate.

Figure 7:
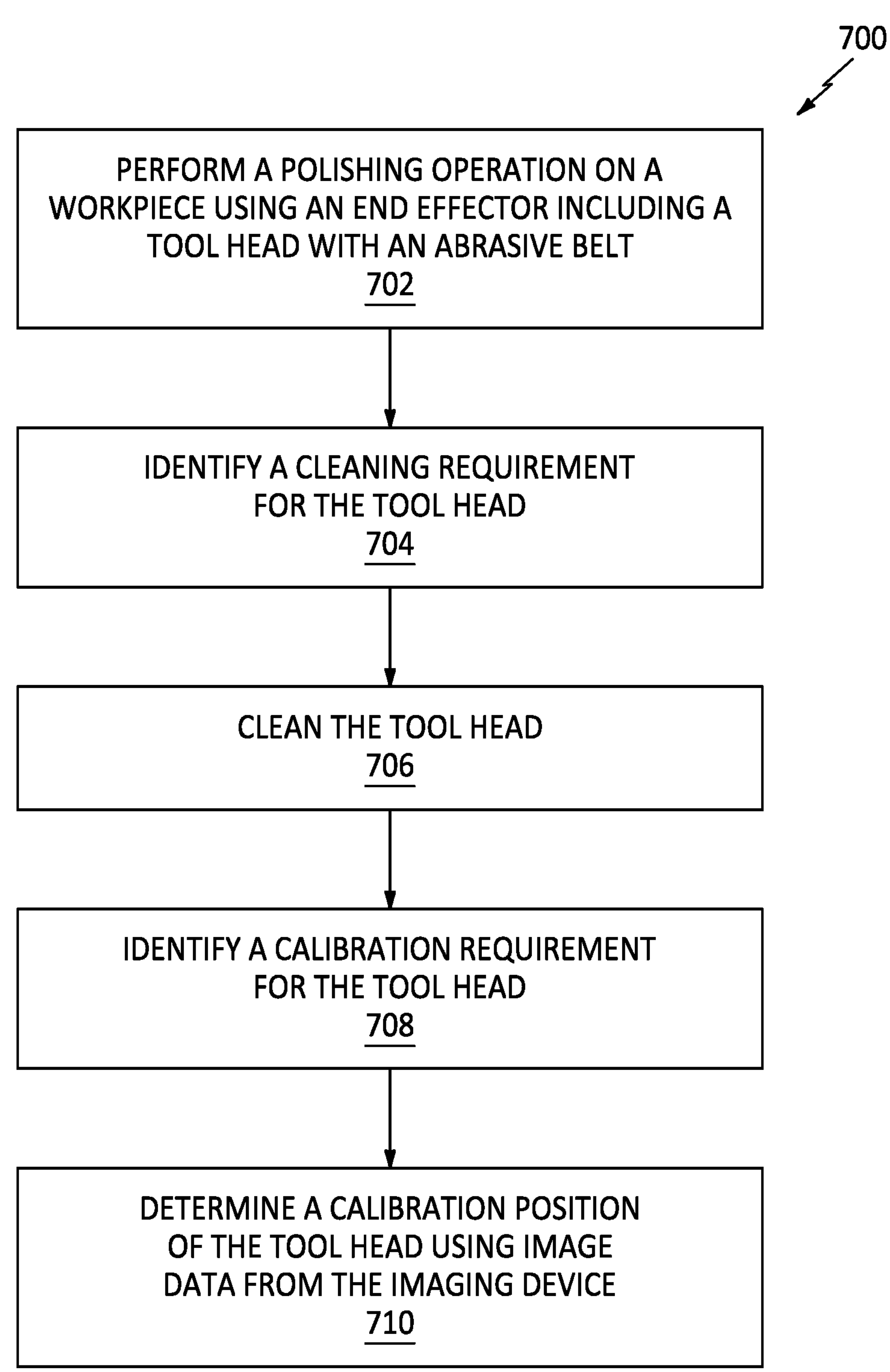
FIG. 7 illustrates a block diagram depicting a method for cleaning a tool head of a polishing system end effector, in accordance with one or more embodiments of the present disclosure.

Referring to FIGS. 1 and 5-8, a Method 700 for cleaning a tool head for a polishing system end effector is provided. FIG. 7 illustrates a flowchart for the Method 700. The Method 700 may be performed for the polishing system 10, as described herein. The controller 14 may be used to execute or control one or more steps of the Method 700. For example, the processor 140 may execute instructions stored in memory 142, thereby causing the controller 14 and/or its processor 140 to execute or otherwise control one or more steps of the Method 700 using the robotic polishing assembly 12 and/or the calibration system 16. However, it should be understood that the Method 700 is not limited to use with the polishing system 10 described herein. Unless otherwise noted herein, it should be understood that the steps of Method 700 are not required to be performed in the specific sequence in which they are discussed below and, in various embodiments, the steps of Method 700 may be performed separately or simultaneously. Further, it should be understood that not all of the steps of the method 700, discussed below, may be required unless otherwise described herein.

Step 702 includes performing a polishing operation on the workpiece 1000 with the robotic polishing assembly 12 and its end effector 22. Pressurized gas (e.g., air) is supplied to the motor 40, thereby driving the rotatable shaft 88 and, in turn, the abrasive belt 44. The controller 14 may execute a series of instructions (e.g., a CNC polishing program) to control the robotic polishing assembly 12 to polish or otherwise machine one or more surfaces of the workpiece 1000. During polishing operations, dust and other particulate may accumulate on the tool head 42, the abrasive belt 44 and other portions of the end effector 22. As will be discussed in further detail, this accumulated dust and other particulate may cover or otherwise visually obscure the artifacts 130 and/or the roller body 136. Polishing operations may also result in gradual degradation (e.g., wear) of the abrasive belt 44.

A new (e.g., previously unused) abrasive belt may be understood to have a generally unstretched condition relative to an abrasive belt which has previously been used in a polishing or other machining operation. This is because abrasive belts may be expected to experience gradual degradation through usage, which degradation may be exhibited, at least in part, by stretching of the abrasive belt. Positioned on the tool head 42, the new abrasive belt 44 may compress the belt tensioner 98 such that the biasing member 108 is compressed between the tool extension 106 and the tool guide 104. In this condition, the tool extension 106 may be positioned at (e.g., on, adjacent, or proximate) a fully compressed position of the tool extension 106 relative to the tool guide 104. As the abrasive belt 44 is used for polishing operations, the abrasive belt 44 will stretch and the biasing member 108 will bias the tool extension 106 outward (e.g., away from the tool guide 104) to maintain suitable tension of the abrasive belt 44.

An abrasive belt may undergo a series of sequential degradation phases which are generally described herein as (1) a pre-break-in phase, (2) a break-in phase, and (3) a post-break-in phase. The pre-break-in phase may be characterized by very high rate of stretching of the abrasive belt 44 relative to the usage of the abrasive belt 44 (e.g., polishing usage as a fraction of the useful life for the abrasive belt 44). The usage of the abrasive belt 44 may be measured or otherwise estimated, for example, using a polishing operational time for the abrasive belt 44, a workpiece surface area polished using the abrasive belt 44, or any other suitable indictor of abrasive belt 44 usage. The present disclosure, however, is not limited to any particular methodology for determining or identifying abrasive belt 44 useful life. Step 702 may include operating the polishing system 10 to perform a polishing operation on a dummy component (e.g., a component which is not the workpiece 1000) while the installed abrasive belt 44 is in the pre-break-in phase. The break-in phase may be characterized by a moderate rate of stretching of the abrasive belt 44 relative to the useful life of the abrasive belt 44. The post-break-in phase may be characterized by a low rate of stretching of the abrasive belt 44 relative to the useful life of the abrasive belt 44. The post-break-in phase may encompass the majority of the useful life for the abrasive belt 44.

As the abrasive belt 44 stretches during usage (e.g., for polishing operations) and the tool extension 106 moves away from the tool guide 104 to maintain tension on the abrasive belt 44, the position of the tool center point 135 at the tip end 96 will change relative to the position of the polishing 36 and upstream components of the tool head 42 (e.g., the tool guide 104). For example, a length of the tool head 42 along the lengthwise axis 92 will gradually increase. As a result, the actual position of the tool head 42 (e.g., the tool center point 135) may become increasingly different than an assumed position of the tool head 42 recognized by the controller 14, which assumed position may be relied upon by the controller 14 to accurately position the tool head 42 relative to the workpiece 1000. Moreover, the rate and/or magnitude of stretching may vary between same or similar abrasive belts 44, and so it may be difficult to accurately estimate how a position of the tool center point 135 will change over the useful life of the abrasive belt 44.

Step 704 includes identifying a cleaning requirement for the tool head 42, the abrasive belt 44, and/or other portions of the end effector 22. As previously discussed, during polishing operations, dust and other particulate may accumulate on the tool head 42, the abrasive belt 44 and other portions of the end effector 22. The cleaning requirement may be indicative a condition in which the tool head 42 and its abrasive belt 44, and/or other portions of the end effector 22 may have accumulated an amount of dust and other particulate such that the operation of the tool head 42, the abrasive belt 44, and/or other portions of the end effector 22 for a polishing operation may be materially diminished. The cleaning requirement may be based on an amount of end effector 22 operational time since a last cleaning. For example, the cleaning requirement may be based on an amount of time for which the tool head 42 has been in contact with the workpiece 1000 (e.g., as determined using the force control device 21 and/or by polishing instructions executed by the controller 14) and operating to polish the workpiece 1000 (see FIG. 1). The cleaning requirement may be based on a measured distance of abrasive belt 44 travel in contact with the workpiece 1000. The cleaning requirement may be based on a predetermined point in a polishing operation, for example, immediately prior to beginning a polishing operation for a new workpiece 1000. The present disclosure, however, is not limited to the foregoing exemplary cleaning requirements. Alternatively, identification of a cleaning requirement may be based on the identification of a calibration requirement for the tool head 42 (see Step 708). In other words, cleaning of the tool head 42 may be performed (e.g., by default) prior to the initiation of a calibration for the tool head 42 position.

Step 706 includes cleaning the accumulated dust and other particulate from the tool head 42 using the tool cleaning assembly 17. For example, in response to the identified cleaning requirement, the controller 14 may control the robotic polishing assembly 12 to position the tool head 42 to interact with the tool cleaning assembly 17. As shown, for example, in FIG. 6, the controller 14 may control the robotic polishing assembly 12 to position the tool head 42 for cleaning by the tool cleaning assembly 17. The controller 14 may control the robotic polishing assembly 12 to position the tool head 42 between (e.g., laterally between) the first lateral brush 156 and the second lateral brush 158 with the with the lengthwise axis 92 extending in a generally vertical direction. The controller 14 may control the robotic polishing assembly 12 to position the tool head 42 downstream of the first lateral air nozzle 160 and/or the second lateral air nozzle 162. The controller 14 may control the robotic polishing assembly 12 and/or the tool cleaning assembly 17 to clean the tool head 42 along the first lateral side 34 followed by cleaning the tool head 42 along the second lateral side 36. When cleaning the tool head 42 along the first lateral side 34, some of the dislodged dust or other particulate may become deposited on the second lateral side 36 (e.g., the lateral side with the artifacts 130, see FIG. 3). Accordingly, the controller 14 may effect cleaning of the tool head 42 along the second lateral side 36 last to prevent inadvertent obscuring of the artifacts 130 with dust or other particulate cleaned from the tool head 42 along the first lateral side 34. For example, the controller 14 may control the robotic polishing assembly 12 to position the tool head 42 at (e.g., on, adjacent, or proximate) the first lateral side 34 against the first lateral brush 156, direct pressurized air onto the tool head 42 with the first lateral air nozzle 160, and move (e.g., vertically withdraw) the tool head 42 from the tool cleaning assembly 17 against the first lateral brush 156. The controller 14 may then control the robotic polishing assembly 12 to position the tool head 42 at (e.g., on, adjacent, or proximate) the second lateral side 36 against the second lateral brush 158, direct pressurized air onto the tool head 42 with the second lateral air nozzle 162, and move (e.g., vertically withdraw) the tool head 42 from the tool cleaning assembly 17 against the second lateral brush 158. Cleaning of the tool head 42 may additionally or alternatively be performed independent of a calibration requirement for the tool head 42, for example, at periodic usage intervals or as manually initiated by an operator.

Step 708 may include, optionally, identifying a calibration requirement for the tool head 42. For example, the controller 14 may identify that a calibration of the tool head 42 position should be performed based on one or more operating conditions of the robotic polishing assembly 12. The controller 14 may then initiate and control performance of the calibration using the robotic polishing assembly 12 and the calibration system 16. The controller 14 may identify the calibration requirement based on an installation of the end effector 22 onto the robotic polishing assembly 12 and/or an installation of the abrasive belt 44 (e.g., a new abrasive belt 44) onto the tool head 42. The controller 14 may identify the calibration requirement based on the initiation of the break-in phase for the abrasive belt 44 (e.g., before the abrasive belt 44 is first applied to the workpiece 1000 for a polishing operation). The controller 14 may identify the calibration requirement based on a measure of abrasive belt 44 usage such as, but not limited to, a polishing operational time for the abrasive belt 44 (e.g., a calibration requirement periodicity) or a workpiece surface area polished using the abrasive belt 44. For example, the controller 14 may identify the calibration requirement when the measure of abrasive belt 44 usage exceeds a usage threshold. The usage threshold for a calibration requirement may vary between different phases of the abrasive belt 44 useful life (e.g., the pre-break-in phase, the break-in phase, and the post-break-in phase). For example, during the post-break-in phase of the abrasive belt 44 the usage threshold for calibration may be greater than the usage threshold for calibration during the break-in-phase of the abrasive belt 44, due to the relatively lower stretching expected in the post-break-in phase. The usage threshold for calibration may be determined analytically and/or experimentally, and may vary depending on the abrasive belt 44 configuration and/or the particular polishing operation (e.g., the tool head 42 positioning accuracy needed for the particular polishing operation) to be performed. Routine experimentation may be performed by a person of ordinary skill in the art to determine a suitable usage threshold for calibration in accordance with and as informed by one or more aspects of the present disclosure. The controller 14 may dynamically identify that a calibration of the tool head 42 position should be performed based, for example, on an unexpected response of the robotic polishing assembly 12 such as, but not limited to, a detected collision of the tool head 42 with another object. Identifying the calibration requirement may include identifying steps of the calibration that should be performed and/or that need not be performed. As an example, calibration for the tool head 42 following an installation of the end effector 22 on the robotic polishing assembly 12 may require additional calibration steps that may not be required for other calibrations (e.g., calibration requirements based on usage).

Step 710 may include, optionally, determining a calibration position of the tool center point 135. The Step 710 for determining the calibration position of the tool center point 135 may not be performed following each cleaning of the tool head 42 (see Step 708). However, the Step 708 for cleaning the tool head 42 may typically be performed prior to (e.g., immediately prior to) the Step 710 for determining the calibration position of the tool center point 135 to facilitate identification of the artifacts 130, the artifacts 74, and/or the roller body 136 using the controller 14 and the imaging device 144.

Figure 8:
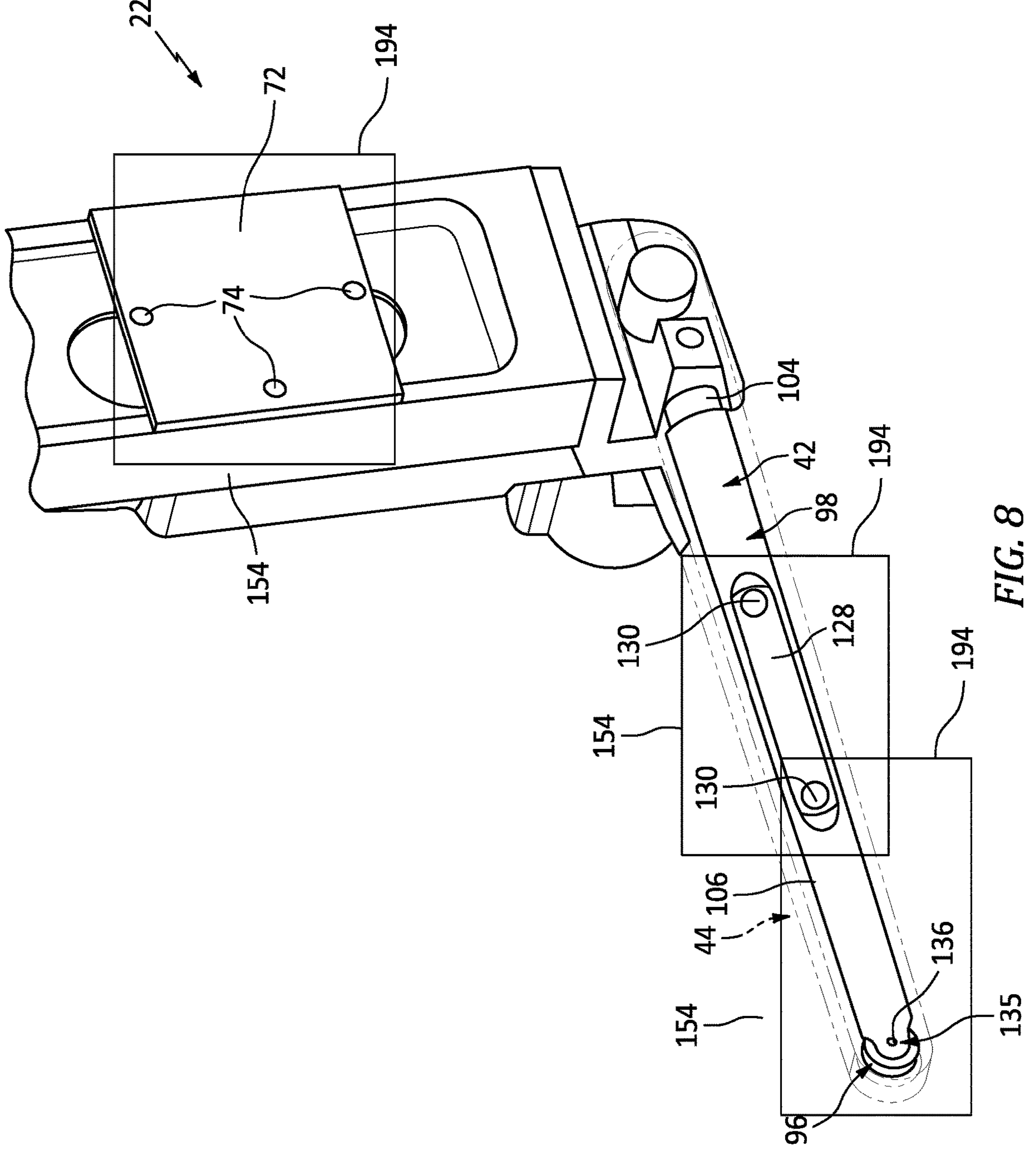
FIG. 8 illustrates another perspective view of an end effector for a polishing system, in accordance with one or more embodiments of the present disclosure.

Determining the calibration position of the tool center point 135 may first include identifying positions of one or more of the artifacts 130, the artifacts 74, and/or the roller body 136 using the imaging device 144. The controller 14 may control the support fixture 152 to position the imaging device 144 with a line-of-sight to the artifacts 130, the artifacts 74, and/or the roller body 136. Each of the artifacts 130, the artifacts 74, and the roller body 136 may be disposed on or otherwise visible from a single side of the end effector 22, for example, the second lateral side 36 as shown in FIG. 6. Of course, each of the artifacts 130, the artifacts 74, and the roller body 136 may alternatively be disposed on or otherwise visible from the first lateral side 34. The controller 14 may control the imaging device 144 to capture one or more images (e.g., 2D image data and/or 3D image data) of the end effector 22 and its artifacts 130, artifacts 74, and roller body 136. To generate image data which is sufficient for the controller 14 to identify the artifacts 130, the artifacts 74, and/or the roller body 136, the imaging device 144 may capture a plurality of images. FIG. 8 illustrates a plurality of images 194 used to generate image data for the artifacts 130, the artifacts 74, and the roller body 136. The plurality of images 194 of FIG. 8 includes three images, however, the present disclosure is not limited to any particular number of images. The image data from the plurality of images 194 may be used by the controller 14 to identify the positions of the artifacts 130, the artifacts 74, and/or the roller body 136 relative to a machine coordinate system for the robotic polishing assembly 12. Identifying the positions of the artifacts 130, the artifacts 74, and/or the roller body 136 relative to a machine coordinate system may additionally include projecting a laser image or another image onto one or more portions of the polishing arm 38 and/or the tool head 42 prior to and during the capture of the plurality of images 194 of the end effector 22 and its artifacts 130, artifacts 74, and roller body 136 to facilitate identification of depth characteristics (e.g., 3D image data) for the end effector 22.

The controller 14 may determine the calibration position of the tool center point 135 by comparing the identified positions of the artifacts 130, the artifacts 74, and/or the roller body 136 to baseline positions of the artifacts 130, the artifacts 74, and/or the roller body 136 (e.g., stored in memory 142), to determine a change of the identified tool center point 135 position relative to the baseline tool center point position. The calibration position of the tool center point 135 may represent an identified actual position of the tool center point 135, for example, relative to the polishing arm 38 (e.g., an axial position of the tool center point 135 along the lengthwise axis 92). The controller 14 may convert the 2D images (e.g., the 2D image data) into a digital model of the end effector 22. The controller 14 may compare the digital model of the end effector 22 to a baseline digital model of the end effector 22 to determine the change of the identified tool center point 135 position relative to the baseline tool center point position. The change of the identified tool center point 135 position relative to the baseline tool center point position may be used by the controller 14 to determine the calibration position of the tool center point 135. The controller 14 may store the calibration position of the tool center point 135 (e.g., the identified position of the tool center point 135) in memory 142. The controller 14 may use the calibration position of the tool center point 135 for controlling the tool head 42 during subsequent polishing operations.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A polishing system comprising:

a robotic polishing assembly including a robotic arm and an end effector, the robotic arm including a plurality of movable joints extending between and to a base end and a distal end, the end effector disposed at the distal end, the end effector including a polishing arm, a motor, and a tool head, the motor mounted on the polishing arm, the tool head extending along a lengthwise axis between and to an inner end and a tip end, the inner end disposed on the polishing arm at the motor, the tool head configured to retain an abrasive belt connected to the motor; and a belt cleaning assembly including a first lateral brush and a second lateral brush; and a controller in signal communication with the robotic polishing assembly and a calibration system, the controller including a processor in communication with a non-transitory memory storing instructions, which instructions when executed by the processor, cause the processor to:

identify a cleaning requirement for the tool head; and control the robotic polishing assembly to clean the tool head by moving the tool head to engage one or both of the first lateral brush and the second lateral brush.

2. The polishing system of claim 1, wherein the instructions, when executed by the processor, further cause the processor to identify the cleaning requirement based on an operational use of the tool head for a polishing operation.

3. The polishing system of claim 1, wherein the instructions, when executed by the processor, further cause the processor to identify the cleaning requirement for the tool head based on an identification of a calibration requirement for the tool head.

4. The polishing system of claim 3, further comprising the calibration system including an imaging device.

5. The polishing system of claim 4, wherein the instructions, when executed by the processor, further cause the processor to control the imaging device to acquire image data for the tool head in response to identification of the calibration requirement.

6. The polishing system of claim 5, wherein the tool extension includes a first lateral side, a second lateral side, and a flat portion, the flat portion disposed on the second lateral side, the tool head including one or more artifacts disposed on the flat portion.

7. The polishing system of claim 6, wherein the instructions, when executed by the processor, further cause the processor to determine a calibration position of the tool center point subsequent to controlling the robotic polishing assembly to clean the tool head.

8. The polishing system of claim 7, wherein the instructions, when executed by the processor, further cause the processor to determine the calibration position of the tool center point using the image data, the image data including the one or more artifacts.

9. The polishing system of claim 1, wherein the tool head further includes a belt tensioner and a roller, the belt tensioner configured to bias the tip end outward from the inner end along the lengthwise axis, the roller rotatable about a tool center point of the tool head at the tip end, the tool head configured to retain an abrasive belt extending between the motor and the roller, the belt tensioner including a tool guide, a tool extension, and a biasing member, the tool guide disposed at the inner end, the tool extension disposed at the tip end, and the biasing member configured to bias the tool extension outward from the tool guide along the lengthwise axis.

10. The polishing system of claim 1, wherein the belt cleaning assembly further includes a first lateral air nozzle and a second lateral air nozzle, the first lateral air nozzle configured to direct a first stream of pressurized air and the second lateral air nozzle configured to direct a second stream of pressurized air.

11. The polishing system of claim 10, wherein the instructions, when executed by the processor, further cause the processor to control the first lateral air nozzle to direct the first stream of pressurized air at the first lateral side and then control the second lateral air nozzle to direct the second stream of pressurized air at the second lateral side.

12. A method for cleaning a tool head of an end effector for a robotic polishing system, the method comprising:

identifying a calibration requirement for the tool head, the tool head extending between and to an inner end and a tip end, the tool head including an abrasive belt, a belt tensioner, a roller, and one or more first artifacts, the abrasive belt disposed on the belt tensioner and the roller, the belt tensioner including a tool guide, a tool extension, and a biasing member, the tool guide disposed at the inner end, the tool extension disposed at the tip end, and the biasing member configured to bias the tool extension outward from the tool guide, the roller rotatable about a tool center point of the tool head at the tip end;

identifying a cleaning requirement for the tool head;

cleaning the tool head by moving the tool head to engage at least one brush of a tool cleaning assembly; and acquiring image data of the tool head subsequent to cleaning the tool head.

13. The method of claim 12, further comprising determining a calibration position of the tool center point using the image data.

14. The method of claim 12, wherein cleaning the tool head further includes directing a stream of pressurized air at the tool head.

15. The method of claim 13, wherein the tool extension includes a first lateral side, a second lateral side, and a flat portion, the flat portion disposed on the second lateral side, one or more artifacts disposed on the flat portion, and the step of acquiring the image data includes acquiring image data of the one or more artifacts.

16. The method of claim 15, wherein cleaning the tool head further includes directing a first stream of pressurized air at the first lateral side and then directing a second stream of pressurized air at the second lateral side.

17. A polishing system comprising:

a robotic polishing assembly including an end effector, the end effector including a tool head, the tool head extending between and to an inner end and a tip end, the tool head including an abrasive belt, a belt tensioner, and a roller, the abrasive belt disposed on the belt tensioner and the roller, the belt tensioner including a tool guide, a tool extension, and a biasing member, the tool guide disposed at the inner end, the tool extension disposed at the tip end, and the biasing member configured to bias the tool extension outward from the tool guide, the tool extension including a first lateral side and a second lateral side, the roller rotatable about a tool center point of the tool head at the tip end; and a calibration system including an imaging device;

a belt cleaning assembly including a first lateral arm portion and a second lateral arm portion, the first lateral arm portion laterally spaced from the second lateral arm portion, the first lateral arm portion including a first lateral brush and a first lateral air nozzle, the second lateral arm portion including a second lateral brush and a second lateral air nozzle; and a controller in signal communication with the robotic polishing assembly and the calibration system, the controller including a processor in communication with a non-transitory memory storing instructions, which instructions when executed by the processor, cause the processor to:

identify a cleaning requirement for the tool head;

control the robotic polishing assembly to clean the tool head by moving the tool head to engage one or both of the first lateral brush and the second lateral brush; and control the first lateral air nozzle to direct a first stream of pressurized air at the first lateral side and then control the second lateral air nozzle to direct a second stream of pressurized air at the second lateral side.

18. The polishing system of claim 17, wherein the instructions, when executed by the processor, further cause the processor to identify the cleaning requirement based on an operational use of the tool head for a polishing operation.

19. The polishing system of claim 17, wherein the instructions, when executed by the processor, further cause the processor to identify a calibration requirement for the tool head and, in response to identification of the calibration requirement, control an imaging device to acquire image data for the tool head subsequent to cleaning the tool head.

20. The polishing system of claim 19, wherein the instructions, when executed by the processor, further cause the processor to identify the calibration requirement based on a measure of abrasive belt usage exceeding a usage threshold.

* * * * *